US009794021B2

(12) United States Patent
Seastrand (10) Patent No.: US 9,794,021 B2
(45) Date of Patent: *Oct. 17, 2017

(54) ELECTROMAGNETIC SPECTRUM MANAGEMENT SYSTEM

(71) Applicant: National Security Technologies, LLC, Las Vegas, NV (US)

(72) Inventor: Douglas R. Seastrand, Las Vegas, NV (US)

(73) Assignee: National Security Technologies, LLC, N. Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/414,519

(22) Filed: Jan. 24, 2017

(65) Prior Publication Data

US 2017/0134116 A1 May 11, 2017

Related U.S. Application Data

(63) Continuation of application No. 15/090,472, filed on Apr. 4, 2016, now Pat. No. 9,559,803.

(60) Provisional application No. 62/142,979, filed on Apr. 3, 2015.

(51) Int. Cl.
| | |
|---|---|
| *H04B 1/40* | (2015.01) |
| *H04K 3/00* | (2006.01) |
| *H04B 1/69* | (2011.01) |
| *H04B 1/04* | (2006.01) |

(52) U.S. Cl.
CPC ............. *H04K 3/825* (2013.01); *H04B 1/04* (2013.01); *H04B 1/69* (2013.01); *H04K 3/41* (2013.01); *H04K 3/42* (2013.01); *H04K 3/43* (2013.01); *H04B 2001/0416* (2013.01); *H04B 2201/70727* (2013.01)

(58) Field of Classification Search
CPC ......... H04K 3/43; H04B 14/04; H04B 1/0007
USPC ............................................... 455/74, 82, 84
See application file for complete search history.

(56) References Cited

U.S. PATENT DOCUMENTS

| | | |
|---|---|---|
| 3,924,234 A | 12/1975 | Cash |
| 5,889,488 A | 3/1999 | Kosaki |
| 6,911,937 B1 | 6/2005 | Sparrow |
| 2005/0001754 A1 | 1/2005 | Sparrow |
| 2006/0140291 A1 | 6/2006 | Thomas |
| 2009/0261258 A1 | 10/2009 | Harris |
| 2009/0288550 A1 | 11/2009 | Willner |
| 2010/0034398 A1 | 2/2010 | Odent |

(Continued)

*Primary Examiner* — Dominic Rego
(74) *Attorney, Agent, or Firm* — Weide & Miller, Ltd.

(57) ABSTRACT

A system for transmitting a wireless countermeasure signal to disrupt third party communications is disclosed that include an antenna configured to receive wireless signals and transmit wireless counter measure signals such that the wireless countermeasure signals are responsive to the received wireless signals. A receiver processes the received wireless signals to create processed received signal data while a spectrum control module subtracts known source signal data from the processed received signal data to generate unknown source signal data. The unknown source signal data is based on unknown wireless signals, such as enemy signals. A transmitter is configured to process the unknown source signal data to create countermeasure signals and transmit a wireless countermeasure signal over the first antenna or a second antenna to thereby interfere with the unknown wireless signals.

20 Claims, 8 Drawing Sheets

(56) References Cited

U.S. PATENT DOCUMENTS

| | | |
|---|---|---|
| 2010/0275690 A1 | 11/2010 | Wrobel |
| 2012/0218139 A1 | 8/2012 | Suzuki |
| 2014/0062784 A1* | 3/2014 | Rison ............... H04B 7/086 342/368 |
| 2014/0170963 A1 | 6/2014 | Delaveau |

* cited by examiner

ELECTROMAGNETIC SPECTRUM MANAGEMENT SYSTEM

PRIORITY CLAIM

This application is a continuation of and claims priority to U.S. patent application Ser. No. 15/090,472 filed on Apr. 4, 2016 which claims priority to and the benefit of U.S. Provisional Patent Application 62/142,979 filed on Apr. 3, 2015.

STATEMENT REGARDING FEDERAL RIGHTS

This invention was made with government support under Contract No. DE-AC52-06NA25946 and was awarded by the U.S. Department of Energy, National Nuclear Security Administration. The government has certain rights in the invention.

BACKGROUND OF THE INVENTION

Field of the Invention

This innovation relates to spectrum management for wireless communications systems and in particular to a method and apparatus for concurrent transmit and receive functions as part of electronic countermeasures.

Related Art

When transmitting information over a wireless channel, the wireless signal is transmitted by a transmitter into free space to be received by a receiver at a remote location. As with many broadcast formats, the wireless signal may be freely received by any party with an antenna and receiver tuned to receive and process the transmitted signal. However, in many instances it is preferred or required to maintain a secure communication channel. While many systems have been developed to establish a private communication link between a wireless transmitter and receiver, many other systems have been developed to intercept and decode the information transmitted over the private communication link. This may include personal communication environments, military, or government agencies that utilize jamming signals or other means to mask or disrupt the private communication link to prevent intercept and decoding by a third party.

As a specific example, military operators and domestic first responders are constantly threatened by improvised explosive devices (IEDs), vehicle-borne improvised explosive devices (VBIEDs), radiological dispersion devices (RDDs), and other penalties. Too often, these penalties can be initiated by remote RF transmitters. Responders have used broadband jammers to flood the airways with RF energy to prevent remote triggering of these devices or have used reactive jammers that have a limited number of RF channels that they can simultaneously protect. Also, responders and operators do not always have prior knowledge of the threat spectrum and have had to presume against what specific threats to protect.

The current prior art is limited to either receiving radio frequency (RF) signals for signal intelligence (SIGINT) or transmitting RF signals as electronic countermeasures (ECM). In the area of electronic counter measure, there have been two basic prior art approaches, namely a high power, all channel jammer approach and a selective jammer approach. Both of these prior art options suffer from disadvantages. The high power, all channel jammer approach utilizes too much power because all channels are flooded with high power jammer signals. This approach also prevents friendly communications because all channels are flooded with high power jamming signals. The selective jammer approach sends out a jamming signal on certain channels, but difficulties arise in determining which channels to jam and which to leave open. Channels left unjammed created an unwanted risk for first responders or other personnel. In addition, a proficient adversary can analyze the countermeasure being deployed and can make adjustments to avoid being denied.

SUMMARY

Figure 1:
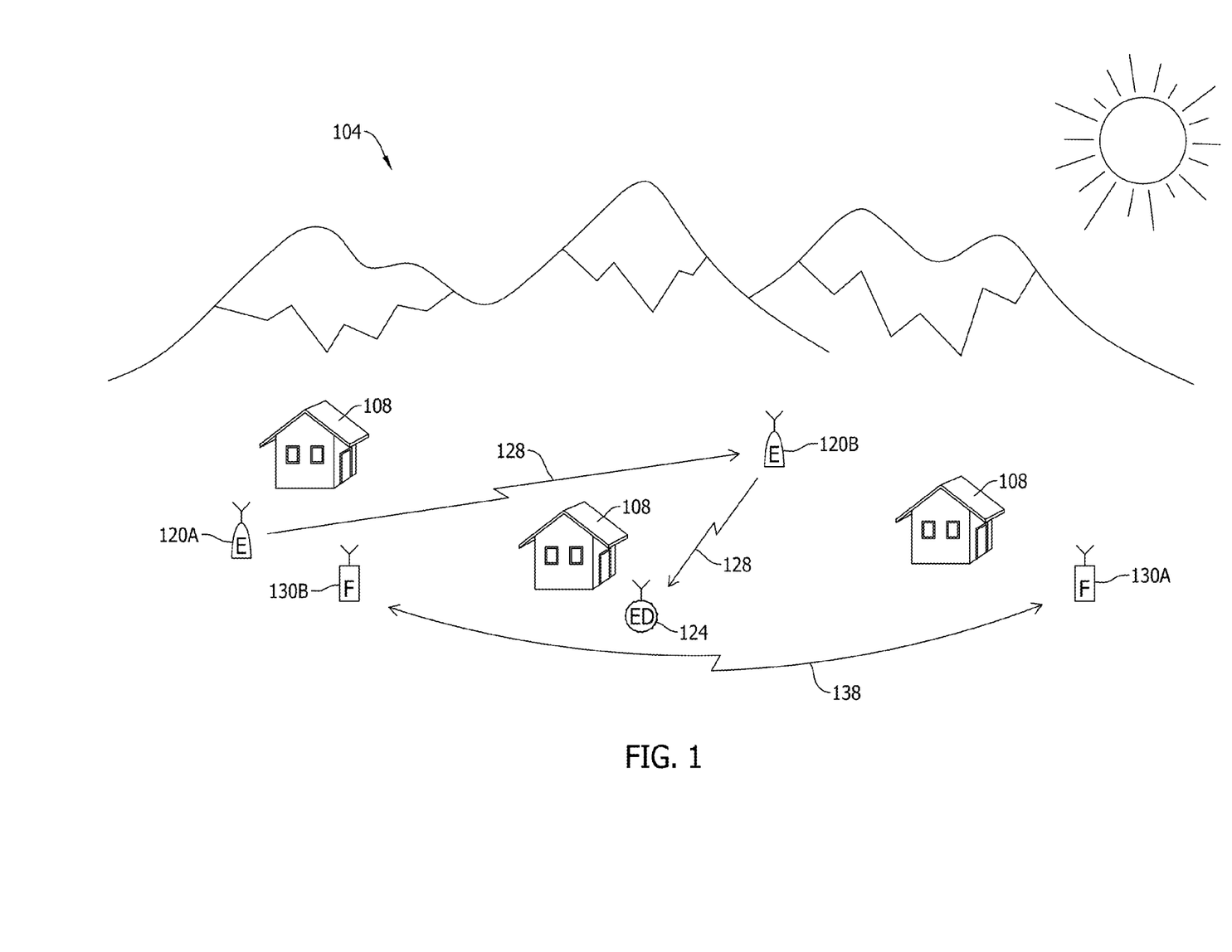
FIG. 1 is an example environment of use of the present invention.

Signal intelligence (SIGINT) is the process of gathering RF signals and gaining intelligent insight from them. The use of SIGINT in real time can identify all RF carriers that are in the immediate area. Capturing an instantaneous spectral snapshot shows the full threat spectrum and the relative power of each RF signal. Friendly signals are already known, so combining this threat spectrum with the friendly channels removed, produces the threat spectrum that needs to be controlled. This process is shown in FIG. 1.

This invention combines SIGINT and ECM together by synchronizing receive and transmit cycles so closely together that they appear to occur simultaneously. This technology enables a new paradigm for controlling the electromagnetic spectrum and improves on current jamming methods. This intelligent jammer allows data and voice communications on "friendly" bands, while disrupting the modulation of all other bands. The "friendly" bands need not be static and accommodates frequency hopping systems. Additionally, this art greatly reduces the power needed to provide RF jamming protection and offers variable output gain to adjust the circumference of protection.

In operation, The ECM system captures all received signals within its bandwidth during a RX cycle. The entire waveform is then converted using a high-speed analog-to-digital (A/D) converter. That digital waveform is then processed using an FFT to produce the entire background threat spectrum in the frequency domain. This spectrum is then modified to remove the friendly channels from the threat spectrum. The new threat spectrum is then converted into an ECM waveform using an inverse FFT (IFFT) to establish the signal in the time domain. This digital wave form is formed into an analog signal using a high-speed digital-to-analog (D/A) converter. The signal now contains a complete ECM (electronic counter measure) of each threat carrier with its modulation removed, but no energy on any of the defined friendly channels. This ECM signal is then amplified to a level higher than the background to ensure the individual modulations are overridden, thereby preventing the enemy signals from being useful for communication or detonations/activations. A variable gain power amplifier controls the size of the protected area.

Disclosed herein, in one embodiment, is a system for transmitting electronic countermeasure signal to disrupt third party communications. The system includes an antenna configured to receive radio frequency signals representing active communication during a first time period and an analog front end configured to process the received signals. An analog to digital converter is configured to convert the received signal to receive signal data and an FFT unit is configured to transform the received signal data from the time domain to a frequency domain signal data. A spectrum control module receives the frequency domain signal data along with known source signal data and subtracts the known source signal data from the frequency domain signal data to generate unknown source signal data.

Also part of this embodiment is an inverse FFT unit configured to process the unknown source signal data to a time domain electronic countermeasure signal. Then a digital to analog converter converts the time domain electronic countermeasure signal to an analog electronic countermeasure signal. A transmit amplifier is configured to amplify the analog electronic countermeasure signal to create an amplified electronic countermeasure signal and present the electronic countermeasure signal to the antenna for transmission during a second time period.

One embodiment of this system further includes a timing control unit configured to synchronize transmit and receive periods. In one embodiment, the unknown source signal data represents enemy communications. The known signal data may comprise frequency data based on a spreading code defining for friendly communications. In one configuration the system also includes a gain controller in communication with the transmit amplifier such that the gain controller is configured to control a transmit power of the amplified electronic countermeasure signal.

In one variation, the system further comprising a user interface configured to control the gain of the transmit amplifier. In one embodiment the system also includes a user interface configured to present spectrum management data to a user based on either or both of the active communications and the unknown source signal data. The first time period and second time period, when combined, are shorter than a minimum trigger signal duration.

Also disclosed is a system for transmitting a wireless countermeasure signal to disrupt third party communications. In one example embodiment, this system includes a first antenna configured to receive wireless signals and transmit wireless counter measure signals such that the wireless countermeasure signal is responsive to the received wireless signals. A receiver is also part of this embodiment and is configured to process the received wireless signals to create processed received signal data. A spectrum control module is provided and configured to subtract known source signal data from the processed received signal data to generate unknown source signal data. The unknown source signal data is based on unknown wireless signals. A transmitter is configured to process the unknown source signal data to create countermeasure signals and transmit a wireless countermeasure signal over the first antenna or a second antenna to thereby interfere with the unknown wireless signals.

In one embodiment the processed received signal data and the known source signal data define frequencies. The unknown wireless signals may be enemy signals. In one exemplary configuration, the system further comprises a time domain to frequency domain converter configured to convert the received wireless signals to the frequency domain to identify frequency components of the received wireless signals and also a frequency domain to time domain converter configured to convert the unknown source signal data to the time domain prior to transmission by the transmitter.

It is contemplated that a gain control unit may also be part of this embodiment and configured to control the transmit power of the transmitter to an area over which the system interferes with the unknown wireless signals. In one embodiment, the system further comprises a modulation detection and modulator unit configured to detect one or more modulation aspects of one or more of the received wireless signals and the replace one or more modulation aspects with replacement modulation aspects before transmitting the wireless countermeasure signals. This can provide incorrect data or information to an enemy.

Also disclosed is a method for generating and transmitting an electronic countermeasure signal based on active frequency spectrum. This method includes receiving signals over an antenna within a frequency band during a first time period. The received signals represent wireless activity within the frequency band. Then converting the received signals to a frequency domain from a time domain to determine a group of frequencies at which wireless activity is occurring. Then, determining frequencies at which friendly communication is occurring, such that the friendly communication defines friendly frequencies. Removing the friendly frequencies from the group of frequencies at which wireless activity is occurring to establish unknown source signal frequencies. This method of operation then converts the unknown source signal frequencies to the time domain to establish unknown source countermeasure signals and then transmits the unknown source countermeasure signals as wireless signals during a second time period to interfere with unknown communications while not affecting friendly communication.

The combined duration of the first time period and the second is less than a minimum command time for an enemy trigger signal. The step of determining frequencies at which friendly communication is occurring includes receiving predefined friendly communication frequencies, receiving a frequency spreading or hopping code, or both.

In one embodiment the method also detects one or more modulation elements of the received signals in the time domain or the frequency domain, such that the one or more modulation elements represents information and then modifying at least one aspect of the one or more modulation elements to create modified modulation elements. This additional step also replaces the at least one aspect of the one or more modulation elements of the received signal with the modified modulation elements to create one or more modified unknown signals, and then transmits the one or more modified unknown signals to thereby transmit modified or incorrect information for reception by an enemy.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

FIG. 1 is an example environment of use of the present invention. This is but one possible exemplary environment of use. It is contemplated that the present invention may find use in any environment where it is desired to limit or prevent communication between third parties, while optionally allowing communication between known parties or known communication devices. The environments of use may be in urban or rural areas, inside or outside, at any elevation, in air, sea, or land environments or in space.

In FIG. 1, an example environment of use 104 is shown that includes both rural and urban components. One or more buildings 108 are shown. Friendly communication devices 130A, 130B are capable of communication over a wireless communication channel 138 to exchange voice, data, or both. It is desired to maintain communication between friendly devices, operated by known and/or friendly personnel as is understood in the art to allow for coordination and tactical effectiveness.

Also shown in FIG. 1 are enemy or unknown communication devices including communication devices 120A and 120B. An enemy receiver or transceiver may be part of an enemy device 124 and is also shown, which may be configured as a trigger for an explosive device, weaponized chemical, camera, or any other remotely triggered enemy device. Wireless communications 128 may occur between the communication devices 120A, 120B or the enemy device 124. The enemy communication device 120B may be used to trigger the enemy device 124. It is essential to disrupt or prevent communication 128 between the enemy communication devices 120A, 120B and also from the enemy communication devices 120A, 120B to the enemy device 124.

The communication devices 120A, 120B, 130A, 130B may be any type communication devices operating at or in any frequency band using any communication standard or format. The communication devices 120A, 120B, 130A, 130B may be portable, such as hand held or body mounted, vehicle mounted, mounted to a building, aerial vehicle, balloon, supported by the ground, or any other structure.

The method and apparatus disclosed herein utilizes Electronic countermeasure (ECM), which is the transmission of RF signals that will distort, disrupt, or alter RF enemy signals. Using the ECM innovation disclosed herein allows development and transmission of an RF signal that will affect all signals, or all signals except those identified as friendly. This concept works on the principle "if you are not my friend, you must be my enemy." Because the threat spectrum and friendly channels change, the threat template must change as well—in real time. By knowing the hopping sequence, even frequency hopping, spread spectrum radio signals are allowed to pass. Because the threat spectrum maintains the relative power in each channel, the resulting ECM uses just enough energy, but not more than needed to match the threat. This minimizes the overall power needed and does not extend the threat protection (RF blocking signal) beyond that needed, thereby not disrupting civilian or other innocent communication. Lastly, an ECM (jammer) signal does not exist until a threat is present; therefore, not even an advanced adversary will be able to detect that an ECM is present, which was a drawback to the prior art approaches.

Figure 2A:
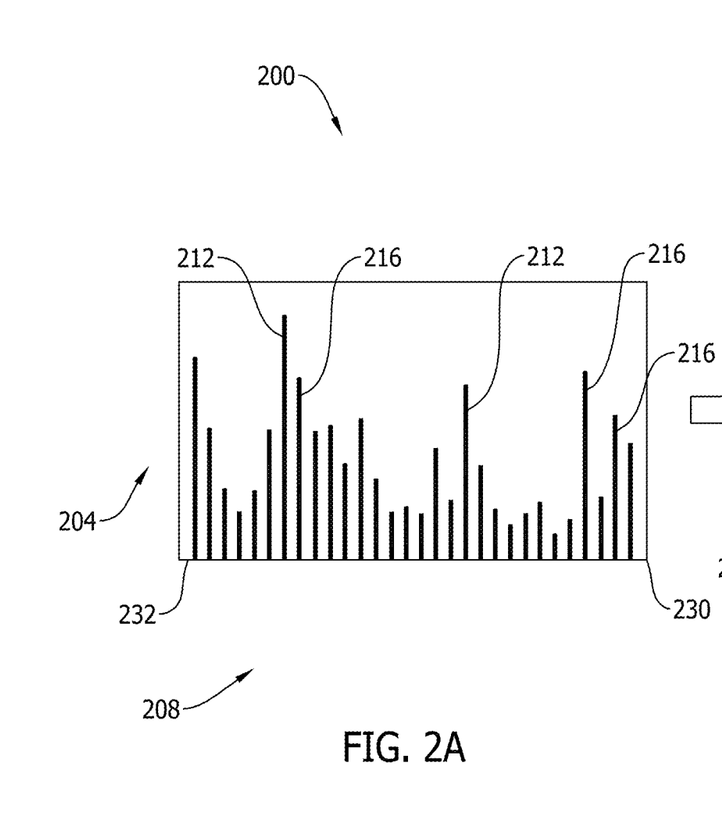
FIG. 2A is a plot of instantaneous threat spectrum represented by signal amplitudes at various frequencies for all detected signals including friendly signals.

FIG. 2A is a plot of instantaneous threat spectrum represented by signal amplitudes at various frequencies for all detected signals including friendly signals. In this example plot, the vertical axis 204 represents signal magnitude or amplitude while the horizontal axis 208 represents frequency. Shown in the plot are all the detected signals based on a signal scan designed to detect all activity over a predefined spectrum defined by a maximum frequency 230 and a minimum frequency 232. Shown on the plot 200 are all the detected signals 212 and 216 at each frequency band. Note that signals are detected at some but not all possible frequencies, and that the amplitude of the signal at each frequency varies as is understood based on the communication standard, distance from the transmitter, and transmit power.

As shown the known sources of communication are signal plots 216 and as such are designated as friendly communications. These communications at these designed frequencies are referred to as friendly signals because these signals are known as friendly either by a spread spectrum code, due to the transmissions occurring at predefined friendly channel, or due to transmissions occurring with the same communication device. The signals (including but not limited to signals 212) other than the friendly signals 216, are defined as enemy signals because these signals are not known to be friendly signals. These enemy signals may pose a threat to friendly personnel or equipment.

As a result, this signal intelligence technique can provide an accurate assessment of potential RF threats. Knowledge of these threats versus friendly RF signals provides an opportunity to build the appropriate electronic countermeasure that will disable all threats but allow friendly signals to pass while using minimal power. No previous technology has been able to do this in real time.

Figure 2B:
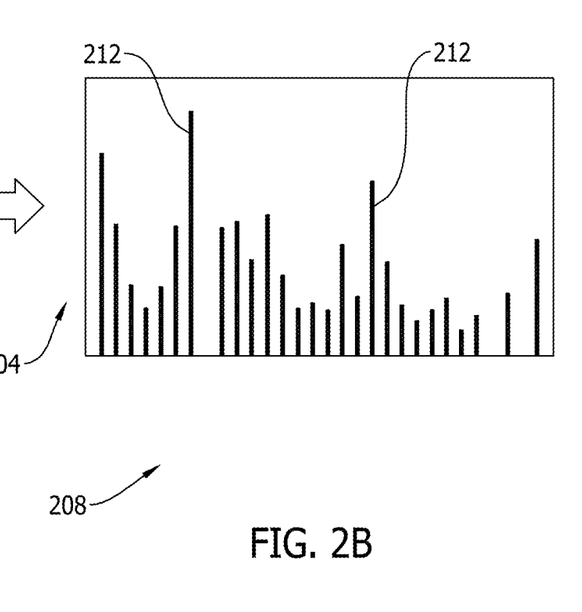
FIG. 2B is a plot of signal amplitudes at various frequencies for all detected signals to be jammed.

FIG. 2B is a plot of signal amplitudes at various frequencies for all detected signals to be jammed. FIG. 2B is generally similar to FIG. 2A. The vertical axis 204 represents signal magnitude or amplitude while the horizontal axis 208 represents frequency. In this plot, the friendly signals have been removed thereby creating a spectrum profile showing only enemy signals 212 (all remaining signals). This information provides a basis or ECM template for which signals could be threat signals to friendly personnel. Because the friendly signals have been removed, actions to disrupt these signals 212 will not disrupt friendly communications. In addition, the ECM template now contains the relative power for each unfriendly signal for each frequency band with no power applied to the friendly channels.

To disrupt the enemy communications, it is proposed to transmit jammer signals on at the frequency bands shown in FIG. 2B to disrupt wireless signals which are not known to be friendly. In addition, the power level of the jammer signal may be at full or maximum power for a jamming transmitter, or scaled to a lower value. When scaling the jamming signal transmit power, the jammer signal may be transmitted at a power level that is related to or based on the magnitude of the received signal, on a frequency by frequency basis, as shown in the plot of FIG. 2B. Thus, for enemy signals which are at a low power level, the transmitted jammer signal may also be at a transmit power level which is less than maximum power. The transmit power for a jammer signal at a particular frequency may be related or ratio-ed to the power level of the enemy signal received on at particular frequency.

Because the transmitted ECM is mostly composed of the received spectrum, it is essential to rapidly alternate between a receive (RX) and transmit (TX) cycle to eliminate potential feedback. The RX cycle is used to capture the RF signals currently present (shown in FIGS. 2A, 2B), and the TX cycle is used to deliver the instantaneous ECM in the form of jammer signals.

Figure 3:
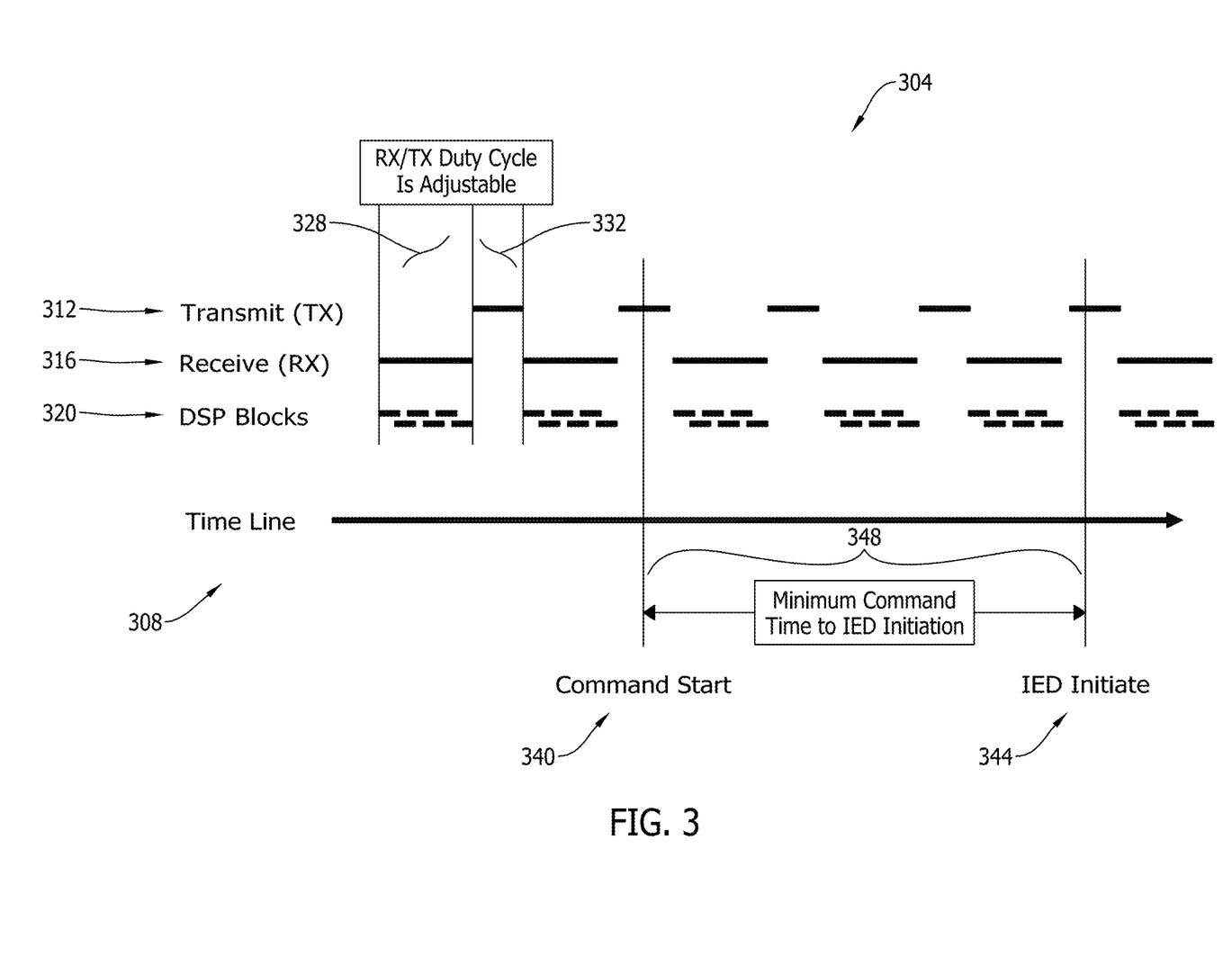
FIG. 3 is a signal plot of transmit and receive cycles with exemplary command time duration.

FIG. 3 is a signal plot 304 of transmit and receive cycles with exemplary command time duration. As shown in this plot, time is represented on the horizontal axis 308 to show transmit periods and receive periods. The transmit periods 312 are periods when the ECM device is transmitting. The receive periods 316 are periods when the ECM device is receiving. The digital signal processor operation 320 (such as for example a fast Fourier transform operation) occurs during the receive periods 316. The duty cycle for each operation 328, 332 are shown and may be of a fixed duration or variable duration. Operation of the ECM system occurs in this manner over time. During firmware development, the RX cycle was occurring 90% of the time and the TX cycle only 10%. Through testing, it was determined that the duty cycle could be 50% for both RX and TX and was adjusted to provide maximum modulation disruption. Other duty cycles are also possible.

In the case of an enemy signal which is a trigger to an enemy device (such as for example and IED), the trigger signal is known to have minimum length of format and is required to trigger or activate the enemy device. The enemy trigger signal has a command start time 340 and a command end time or IED initiate 344. The duration between the start 340 and end 344 is the minimum enemy command time 348. The minimum enemy command time 348 is important because the jammer signal intended to disrupt the enemy trigger signal must be generated and transmitted within a time that is less than the minimum enemy command time 348. By disrupting at least part of the minimum enemy command time 348, the trigger signal will be disrupted and the IED, or other device, will not be detonated. In this example, three full RX cycles and two complete TX cycles occur to disrupt the intended modulation during the hypothetical time required for the modulation scheme or code to initiate the detonation or other action.

Stated another way, all RF remotely detonated devices require some form of modulation, code, or character sting to initiate the explosive, otherwise any stray RF signal at the right frequency could inadvertently detonate the device at an unwanted time. Therefore, a modulation scheme is part of a remote RF trigger. In order to thwart the remote trigger, one only needs to remove or alter the modulation sufficiently to disrupt the intended modulation or code, thus confusing the receiver and preventing the detonation. Each modulation scheme has a minimum time required to recognize a valid modulation. In order to be successful, the ECM system RX and TX cycle must occur at least once within the modulation recognition window thereby sending out a jamming signal which will disrupt the trigger signal.

Figure 4:
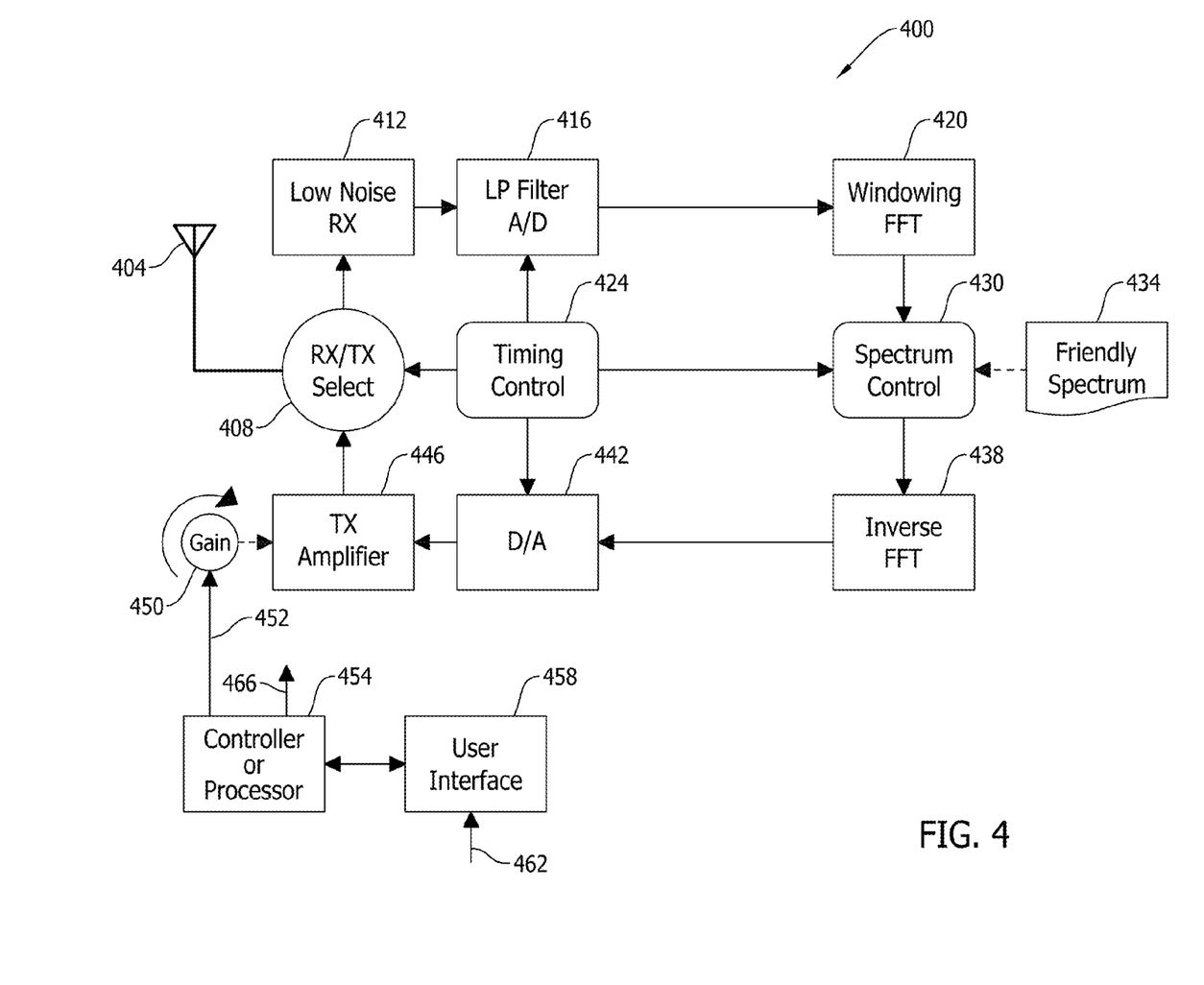
FIG. 4 is a block diagram of an example embodiment of an electronic counter measure (ECM) system.

FIG. 4 is a block diagram of an example embodiment of an exemplary Electronic countermeasure (ECM) system. This is but one possible block diagram and configuration for the ECM system. Other embodiments and configurations may be designed and built which do not depart from the claims that follow.

In this embodiment, the ECM system 400 includes an antenna 404 which is configured to receive and transmit wireless signals. As discussed below in more detail, the antenna 404 is configured or tuned to a set frequency spectrum having a limited bandwidth. Although shown as one antenna, more than one antenna may be part of the ECM system 400. The antenna 404 connects to an Rx/Tx select switch 408 which switches the antenna between transmit mode and receive mode based on an input from a timing control module 424. Timing control between transmit and receive modes is known in the art, and as such is not described in detail herein. The Rx/Tx select switch 408 includes a received signal output and an input to receive a signal to be transmitted. The signal output for the received signal connects to a low noise analog front end (AFE) 412 to perform analog domain processing on the received signal to establish the received signal at a level suitable for a low pass filter and analog to digital converter 416. The low pass filter and analog to digital converter 416 performs filtering on the analog signal to isolate desired signal frequencies, and the A/D converter converts the received signal to a digital format. Filtering may also or alternatively occur in the digital domain.

In other embodiments, it is contemplated to enable or replace the Rx/Tx 408 with a mechanism that allows for simultaneous transmit and receive and would not require switching. This may be referred to as a wireless full duplex communication system. The antenna may be modified such as using any of various antenna configurations that have been used for simultaneous transmit and receive (STAR) applications with on directional pattern coverage. In other embodiments more than one antenna may be in the system to enable such operation. It is contemplated that a circulator may be used. It is also contemplated that different modulation schemes maybe used at the same time, one for receiving and a different one for transmitting. In addition, a planar array or a ring array antenna having a linear phase progression with increasing angle around the array circumference can be used to produce the omnidirectional radiation pattern. By allowing for simultaneous transmit and receive operations the time between receive and transmit functions can be reduced thereby increasing operational speeds and reducing reaction time to possible threat signals.

The low pass filter and analog to digital converter 416 presents the digital signal to a windowing FFT unit 420 configured to process and transform the signal to isolate signal components from the time domain into the frequency domain to isolate the received signal components at various frequencies including amplitude information for each isolated frequency. In one embodiment, a software radio development kit (Xilinx Kintex-7 FPGA DSP) with a field-programmable gate array (FPGA) was used to implement the FFT and IFFT processes. The FFT and IFFT operations may be performed in hardware or software.

The output of the windowing FFT unit 420 is presented to a spectrum control module 430 which also receives input defining the friendly spectrum elements from a friendly spectrum database 434, which may be memory, register, store, or other element. It is contemplated that the friendly spectrum may dynamically change over time. The spectrum control module 430 processes the input from the windowing FFT unit 420 and the friendly spectrum database 434 to create a list of enemy frequency content (spectrum components) which are to be jammed by a jamming signal and the respective amplitude for each. The spectrum control module 430 then removes or deletes the friendly spectrum (signals which are friendly or will be friendly) as defined by the friendly spectrum database 434 from the list of frequencies to be jammed. This results in the plot shown in FIG. 2B.

The output of the spectrum control module 430 is presented to an inverse FFT module 438 which processes the enemy frequency content from the frequency domain back into the time domain. The resulting signal is presented to a digital to analog converter 442 which converts the digital signal to the analog domain. A timing control signal is also provided from the timing control module 424 to the D/A converter 442 as shown to control and synchronize timing of the system.

The output of the D/A converter 442 presents the analog signal to a transmitter amplifier 446 which receives a gain control signal from a variable gain unit 450. The elements 446 and 450 function as a variable gain amplifier (VGA), which is generally known in the art. To control or scale up the transmit power of the signal presented to the transmit/receive switch 408. By adjusting the gain of the transmit amplifier 446 the analog signal from the D/A converter 442 may be transmitted at an increased or decreased magnitude to thereby increase or decrease the size of the threat protection zone or bubble which extends outward from the ECM system 400. The amplified signal from the transmit amplifier 446 is presented to the receive/transmit switch 408, which is synchronized by the timing control 424 unit to be presented to the antenna.

A controller or processor 454 provides a gain control signal to the gain control module 450 on control output 452. Any type controller or processor 454 may be utilized. One or more additional control signals are provided from the controller or processor 454 to one or more various other elements of the ECM system 400 over control output 466. A user interface 458 is in electrical communication with the controller or processor 454 to thereby receive input from a user and provide system information to a user. The user interface may include one or more keys, buttons, pointers, screens, displays, connectors, ports 462, or other input/output devices.

In operation, an entire RF frequency spectrum is capable of being received by the antenna when the antenna is in the environment of use and deployed. The signals received by the antenna during a receive period are presented through the receive/transmit switch 408 to the low noise receiver (AFE) 412 for analog processing and then to the low pass filter where only the frequencies of interest are forwarded, and then the signal is converted to a digital format in element 416.

The received signal frequencies, now in the digital domain, and converted from the time domain to the frequency domain in the FFT 420 to isolate the signal amplitudes at each specific frequency based on the frequency band of interest as is shown in FIG. 2A. The resulting frequencies are all the active frequencies during the receive period defined by the timing control unit 424. Some of the frequencies may be enemy communication and some may be friendly communications. The active frequencies may change over time, such as in the case of spread spectrum communications, CDMA, or other frequency hopping communication standards.

The resulting frequency and amplitude components are presented to the spectrum control module 430 which subtracts, from the list of active frequencies, the frequencies which are known to be carrying friendly communications. After subtraction, the list of remaining active frequencies are defined as enemy frequencies because these frequencies could be enemy frequencies and are not known friendly frequencies.

The source of the friendly spectrum, received from the friendly spectrum database 434 may be from any source including but not limited to a spreading code, predefined frequency channels, time-dependent frequency hopping sequence. Although designated as a database 434, the friendly spectrum information may come from any source.

The resulting list of active frequencies (active enemy frequencies) with amplitude information is presented to the inverse FFT module 438 to restore the frequency content information to the time domain, and the time domain signal is converted using the D/A converter 442 to the analog domain from the digital domain. The resulting analog signal is amplified by the transmit amplifier 446 to a power level suitable for driving the signal over the antenna. The transmitted signal has a power level controlled by the variable gain unit 450 to thereby increase or decrease the power level of the jammer signals, which in turn increases or decreases the size of the zone or bubble which is protected from the enemy communications. This increase and decrease in power level occurs across all frequencies to scale the transmit signal upward or downward. Each jammer signal at each frequency has its own amplitude, which is at or corresponds to the amplitude of the corresponding received signal. The gain applied during transmission scales each signal amplitude upward or downward. At this stage, the signal is analog so the signal is continuous time.

A user, using the user interface 458 and processor 454 may control one or more aspects of the ECM device. For example, by adjusting the transmit gain level the size of the threat protection area may be increased. In addition, friendly spectrum may be manually modified from that automatically detected or provided by the friendly spectrum database 434.

Transmitting the jammer signals blocks or interferes with all communication other than the defined friendly signals. This will disrupt enemy voice and data communication and disrupt detonation signal sent to TED devices. The frequency at which jammer signals are generated and transmitted directly correspond to only enemy (unknown source) received signals. This provides many benefits. One such benefit is that it directly responds to potential threats by generating jammers immediately when threat signals are detected. This removes the guess work associated with determining which frequencies to transmit jamming signals. Likewise, the amplitude or power level of the transmitted jamming signals also correspond to the amplitude of the received and detected active enemy signals thereby establishing a reliable basis for the transmit power, which further provides control by the gain adjustment.

These features result in significant improvements in power consumption because jamming signals are only generated at frequencies which contain possible threat signals. If no enemy signals are detected, then no jammer signals are transmitted. Likewise, if the detected enemy signals are at a lower power, then the jamming signals will likewise be transmitted at a lower power because high power jammer signals are not required to jam low power enemy signals. In the event that a high power enemy signal is detected, then the ECM system automatically increases its power level to jam the high power enemy signal.

Figure 5:
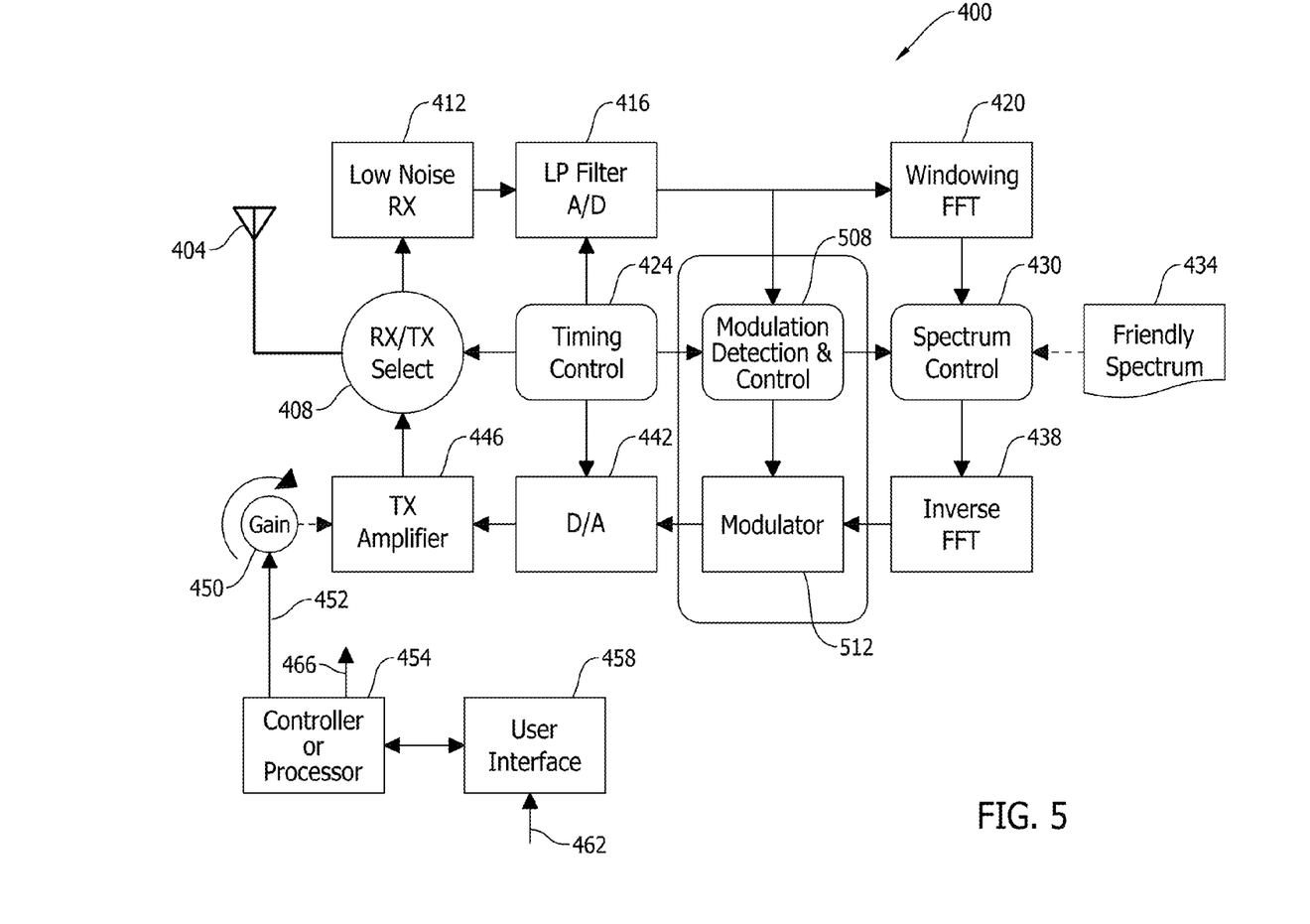
FIG. 5 is a block diagram of an example embodiment of an electronic counter measure (ECM) system with signal management capability.

FIG. 5 is a block diagram of an example embodiment of an electronic counter measure (ECM) system with signal management capability. FIG. 5 is generally similar to FIG. 4 and generally similar or identical elements are identified with identical reference numbers. Added to FIG. 5 is a modulation control feature that includes a modulation detection and control unit 508 and a modulator 512. The modulation detection and control unit 508 receives the digital domain version of the received signal. In other embodiments, the modulation detection and control unit 508 may receive the received signal in the frequency domain directly from the FFT 420. The modulation detection and control unit 508 processes the signal to detect and decode the modulation on the received signal to thereby determine the information being transmitted by the enemy communications. This may be helpful for counterintelligence or to determine information that the enemy is transmitting. The enemy signals could be isolated and decoded to obtain relevant information.

In addition, the system may be configured to extract the enemy information, modify or edit the enemy information, and using modulation block 512, insert or re-introduce the edited information into the signal being transmitted as the jammer signal or as a counterintelligence signal. For example, if one of the signals being received by an enemy is a location or timing signal, then the modulator 512 may insert incorrect location or timing signal data into the transmitted jammer to thereby confuse the enemy and disrupt their ability to coordinate.

Figure 6:
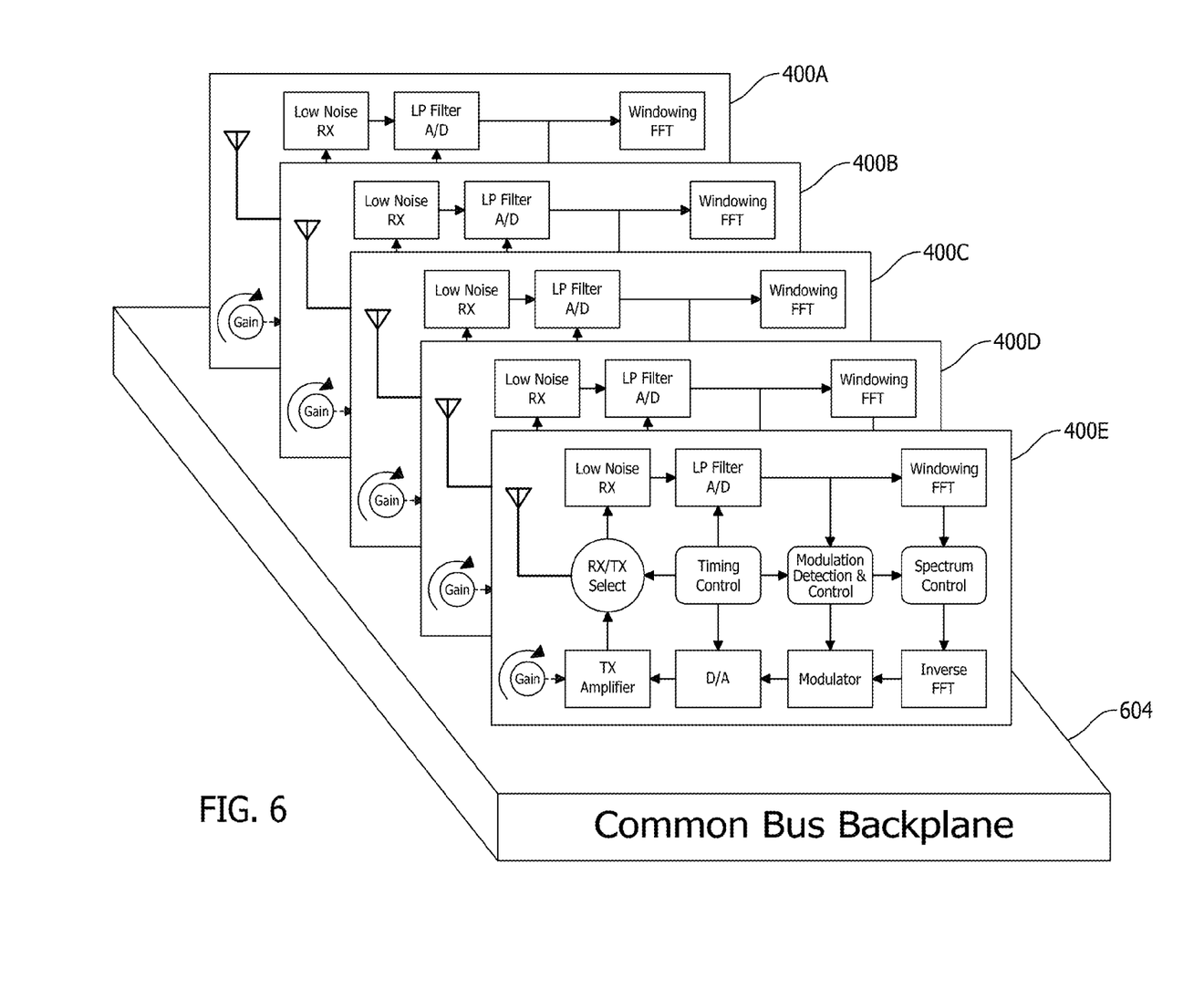
FIG. 6 is a block diagram of an example embodiment of a composite system with multiple electronic counter measure systems.

FIG. 6 is a block diagram of an example embodiment of a composite system with multiple electronic countermeasure systems. This is but one possible layout arrangement for a system having multiple ECM systems. As shown, multiple ECM systems 400A, 400B, 400C, 400D, 400E are arranged together to expand the frequency bandwidth which may be monitored, modified, and jammed. The ECM systems 400A, 400B, 400C, 400D, 400E may share a common bus or backplane 604, or may be located remotely from other ECM systems.

In certain embodiments, each ECM system 400A, 400B, 400C, 400D, 400E is tuned to operate in a different frequency band and while similarly configured, each ECM system may have a different antenna configuration or other elements to enable operation in different frequency bands. Theoretically, it would be possible to cover 1 GHz of bandwidth with a single ESMS module, then heterodyne (up/down convert) 8 modules to cover DC to 8 GHz bandwidth. Each module would work independently but would share a common backplane and user interface. Future advances in hardware will extend the frequency range and capability of the innovation disclosed herein.

Figure 7:
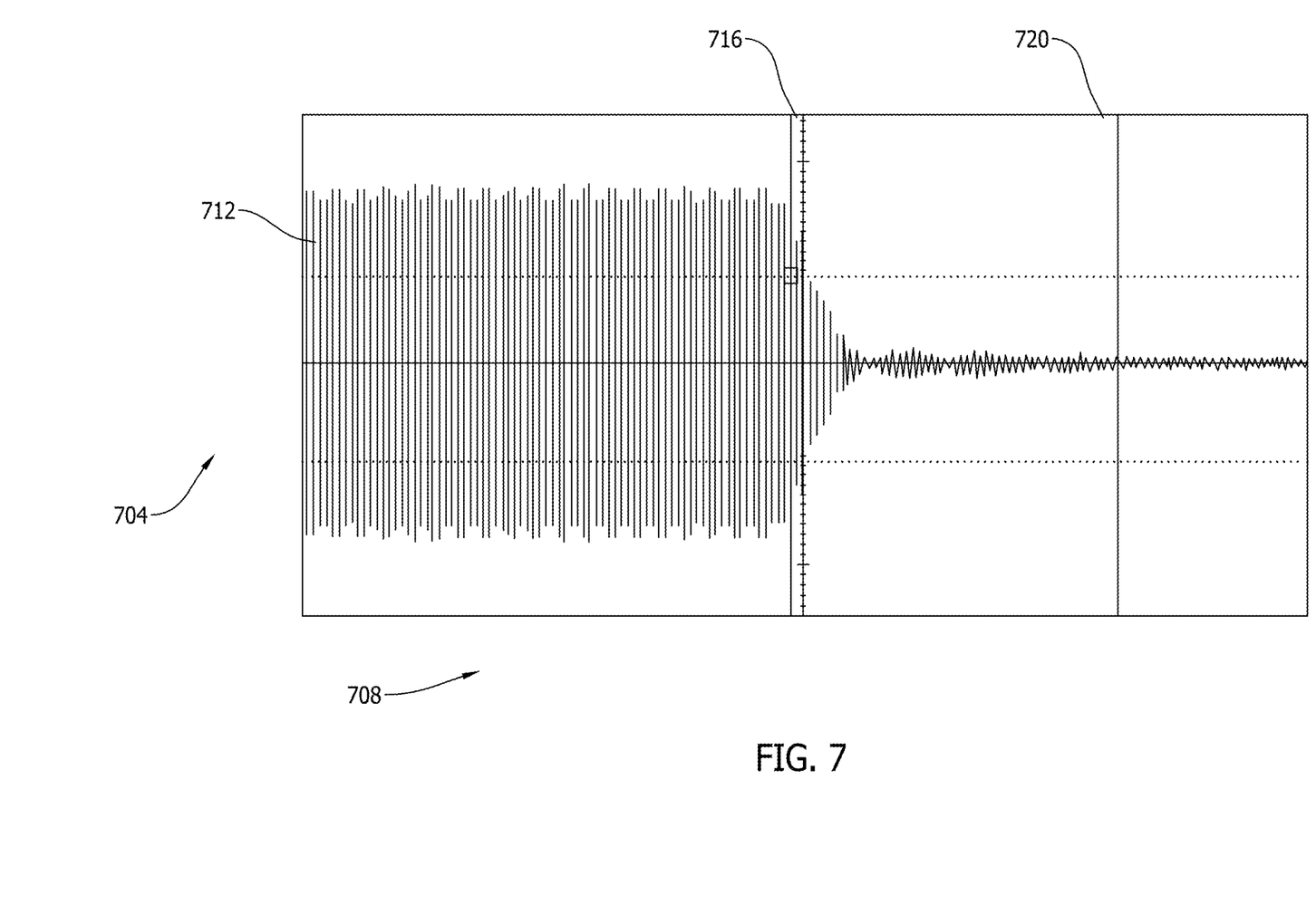
FIG. 7 is a signal plot of antenna ring time after drive signal termination.

FIG. 7 is a signal plot of antenna ring time after drive signal termination. To quickly switch between transmit and receive operation requires that the antenna physically be able to transition between transmit and receive without excessive ring. Ring can affect receive function by interfering with incoming signals. Although multiple antenna could be used in alternative embodiments, it was preferred to use a single antenna for both transmit and receive. If the antenna were to resonate or "ring" for extended periods of time it would necessitate long delays between each transmit and receive cycle. Testing involved multiple antennas, over a range of frequencies up to 800 MHz and at powers up to 40 W. Testing revealed negligible ringing with the worst case being 65 ns, as shown in FIG. 7. The vertical axis 704 is signal amplitude defined by antenna output 712 while the horizontal axis 708 defines time. At time point 716, the drive signal to the antenna is terminated. At time point 720, real time testing reveals the ring or output from the antenna has sufficiently subsided to allow signal reception.

Figure 8:
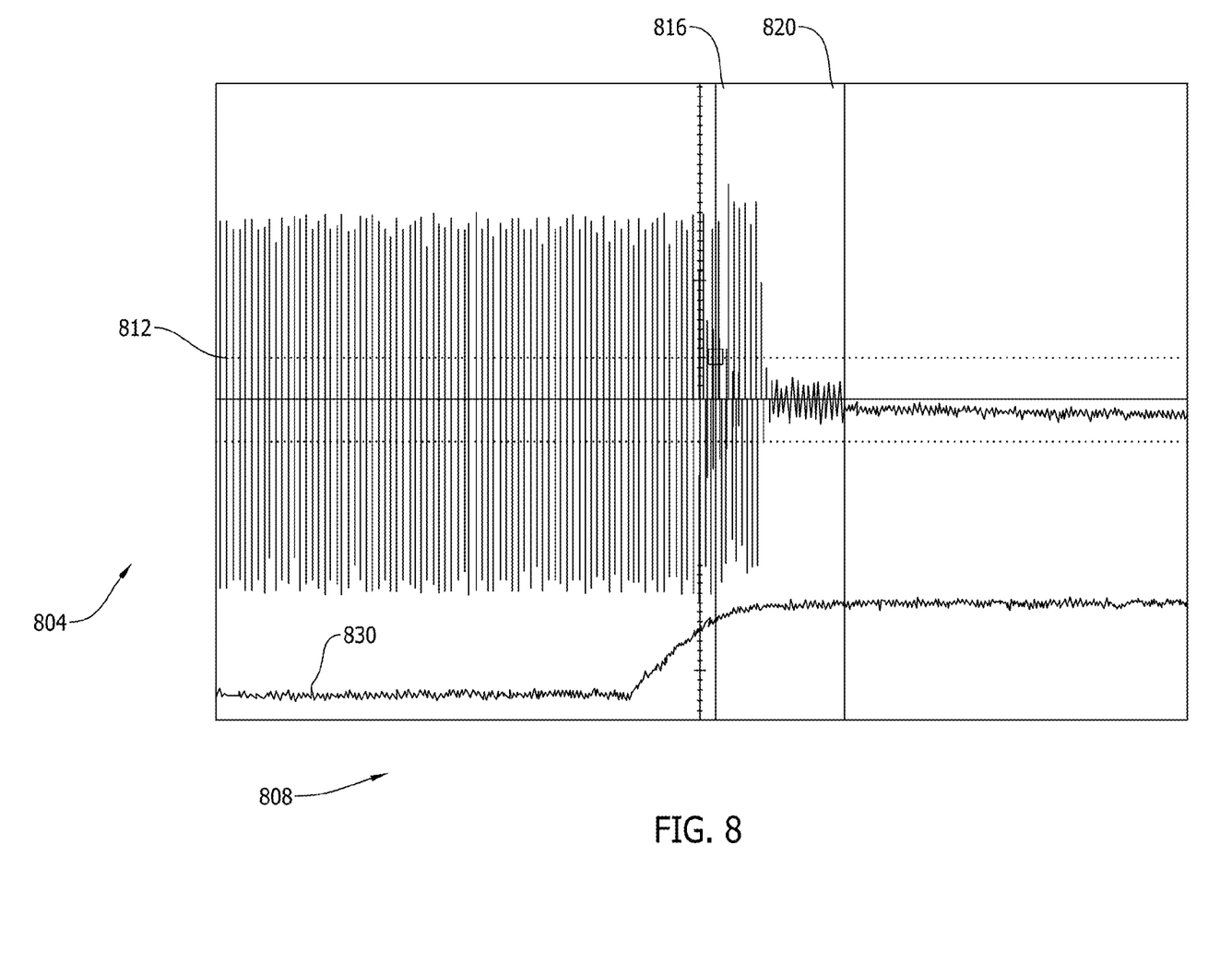
FIG. 8 is a signal plot of time delay between signal control switch transition to RF signal transition in an exemplary ECM system.

FIG. 8 is a signal plot of time delay between a signal control switch transition to an RF signal transition in an exemplary ECM system. It is recognized that to rapidly switch between the RX and TX cycles, it is important to quickly turn off the RF transmitter to enter into receive mode. As shown in FIG. 8, the vertical axis 804 represents signal amplitude while the horizontal axis 808 represents time. The switch control signal is shown as signal 830, which transitions to an on state to turn off the RF signal 812 presented to the antenna, at a first time 816. It takes a period of time until the RF signal is off. This time period is shown on the graph as a second time 820. The switch of the disclosed embodiment is a reflective switch with a manufacturer's specified switching speed of 70 ns. After testing at a range of power up to 40 W and a range of frequencies up to 800 MHz, it was determined that the typical switching speed was about 60 ns, with the longest measuring 235 ns. These test results meet the RF section control requirements. In the example embodiment built for testing the high-speed analog I/O (input/output) board digitizes at 245.760 Msps (megasamples per second), providing a bandwidth of 122.88 MHz. In order to operate in the GMRS/FRS test bands, it was determined to heterodyne (up/down convert) to this higher base band using a mixing frequency of 425 MHz for a final bandwidth of 425-547.88 MHz. In other embodiments and for other frequency bands or communication standards, different numeric values will be utilized.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A system for transmitting electronic countermeasure signal to disrupt third party communications comprising:
   an antenna configured to receive radio frequency signals representing active communication during a first time period;
   an analog front end configured to process the received signals;
   an analog to digital converter configured to convert the received signal to received signal data;
   an FFT unit configured to transform the received signal data from the time domain to a frequency domain signal data;
   a spectrum control module configured to receive the frequency domain signal data and known source signal data and subtract the known source signal data from the frequency domain signal data to generate unknown source signal data;
   an inverse FFT unit configured to process the unknown source signal data to a time domain electronic countermeasure signal;
   a digital to analog converter configured to convert the time domain electronic countermeasure signal to an analog electronic countermeasure signal;
   an transmit amplifier configured to amplify the analog electronic countermeasure signal to create an amplified electronic countermeasure signal and present the electronic countermeasure signal to an antenna for transmission during the first time period.

2. The system of claim 1, further comprising a timing control unit configured to provide time based synchronization the entire system.

3. The system of claim 1, wherein the unknown source signal data represents enemy communications.

4. The system of claim 1, wherein the known signal data comprises frequency data based on a spreading code for friendly communications.

5. The system of claim 1, further comprising gain controller in communication with the transmit amplifier, the gain controller configured to control a transmit power of the amplified electronic countermeasure signal.

6. The system of claim 1, further comprising a user interface configured to control the gain of the transmit amplifier.

7. The system of claim 1, further comprising a user interface configured to present spectrum management data to a user based on either or both of the active communications and the unknown source signal data.

8. The system of claim 1, wherein the first time period and second time period, when combined, are shorter than a minimum trigger signal duration.

9. A system for transmitting a wireless countermeasure signal to disrupt third party communications comprising:
  a receiver configured to process a received wireless signal to create a processed received signal data;
  a spectrum control module configured to subtract known source signal data from the processed received signal data to generate unknown source signal data, the unknown source signal data based on unknown wireless signals; and
  a transmitter configured to process the unknown source signal data to create countermeasure signals and transmit a wireless countermeasure signal to thereby interfere with the unknown wireless signals.

10. The system of claim 9, wherein the processed received signal data and the known source signal data define frequencies.

11. The system of claim 9, wherein the unknown wireless signals are enemy signals.

12. The system of claim 9, further comprising:
  a time domain to frequency domain converter configured convert the received wireless signals to the frequency domain to identify frequency components of the received wireless signals; and
  a frequency domain to time domain converter configured convert the unknown source signal data to the time domain prior to transmission by the transmitter.

13. The system of claim 9, further comprising a gain control unit configured to control the transmit power of the transmitter to cover area over which the system interferes with the unknown wireless signals.

14. The system of claim 9, further comprising a modulation detection and modulator unit configured to detect one or more modulation aspects of one or more of the received wireless signals and replaced one or more modulation aspects with replacement modulation aspects when transmitting the wireless countermeasure signals.

15. The system of claim 9, wherein the system receives the received wireless signal and transmits the wireless countermeasure signal at the same time.

16. A method for generating and transmitting an electronic countermeasure signal based on active frequency spectrum comprising:
  receiving wireless signals within a frequency band during a first time period, the received wireless signals representing wireless activity within the frequency band;
  converting the received signals from a time domain to a frequency domain to determine frequencies at which wireless activity is occurring;
  determining frequencies at which friendly communication is occurring, the friendly communication defining friendly frequencies;
  removing the friendly frequencies from the frequencies at which wireless activity is occurring to establish unknown source signal frequencies;
  converting the unknown source signal frequencies to the time domain to establish unknown source countermeasure signals;
  transmitting the unknown source countermeasure signals as wireless signals to interfere with unknown communications while not affecting friendly communication.

17. The method of claim 16, further comprising one or more antenna configured to simultaneously transmit the unknown source countermeasure signals and receive wireless signals.

18. The method of claim 16, wherein determining frequencies at which friendly communication is occurring includes receiving predefined friendly communication frequencies, receiving a frequency spreading or hopping code, or both.

19. The method of claim 16, further comprising:
  detecting one or more modulation elements of the received signals in the time domain or the frequency domain, the one or more modulation elements representing information;
  modifying at least one aspect of the one or more modulation elements to create modified modulation elements;
  replacing the at least one aspect of the one or more modulation elements of the received signal with the modified modulation elements to create one or more modified unknown signals;
  transmitting the one or more modified unknown signals to thereby transmit incorrect information.

20. The method of claim 16, wherein the receiving and transmitting occurs simultaneously.

* * * * *

UNITED STATES PATENT AND TRADEMARK OFFICE
CERTIFICATE OF CORRECTION

| | |
|---|---|
| PATENT NO. | : 9,794,021 B2 |
| APPLICATION NO. | : 15/414519 |
| DATED | : October 17, 2017 |
| INVENTOR(S) | : Douglas R. Seastrand et al. |

It is certified that error appears in the above-identified patent and that said Letters Patent is hereby corrected as shown below:

On the Title Page

Item (72), should read:

-- Inventors: Douglas R. Seastrand, Las Vegas, NV (US); Rudolpha M. Jorgensen, Las Vegas, NV (US); Eric Joseph Schmidthuber, Henderson, NV (US) --

Signed and Sealed this
Twentieth Day of February, 2018

Andrei Iancu
*Director of the United States Patent and Trademark Office*